May 19, 1959

C. G. SMITH ET AL 2,887,554

SUBMINIATURE POTENTIOMETER

Filed June 3, 1957

INVENTORS
WILLIAM B. ALLEN,
CLARENCE G. SMITH.

BY

ATTORNEY

United States Patent Office 2,887,554
Patented May 19, 1959

2,887,554

SUBMINIATURE POTENTIOMETER

Clarence G. Smith and William B. Allen, Los Angeles, Calif., assignors to Hughes Aircraft Company, Culver City, Calif., a corporation of Delaware Application June 3, 1957, Serial No. 664,881

5 Claims. (Cl. 201—55)

This invention relates to variable resistance devices, and particularly to a potentiometer of extremely small size.

The principles are particularly embodied in a potentiometer for use in airborne equipment. Devices are well known in the art for introducing controlled amounts of resistance into electrical circuits. Such devices vary widely in size, weight, and current-carrying capacity from relatively small, carrying currents in the micro-ampere range, to very large, in which the load capacity may be measured in thousands of amperes. Current demands for use in airborne equipment have resulted in great effort toward reducing the size and weight of all types of electrical components. The miniaturizing of potentiometers has been included in the efforts so directed.

Not only must equipment for airborne use be as compact and light as possible, but, in addition, it must be free from service interruptions due to vibration, or to the accelerations experienced when a plane is engaged in rapid maneuvers or a missile is launched.

The present invention is embodied in an extremely small, hermetically sealed potentiometer which may be mass produced and readily assembled at very low cost. It has a minimum number of parts, and is so arranged that the resistance element itself is moved during adjustments rather than a sliding contact member.

These and other features of advantage which will be seen hereafter make possible a potentiometer so small (0.3″ x 0.3″ x 0.2″), and of so small a mass that it is well adapted to use in electronic equipment in airplanes, guided missiles, and the like.

The primary object of the invention is thus to provide a reliable, efficient, light-weight and easy to manufacture potentiometer.

Another object is to provide an improved form of subminiature potentiometer.

Still a further object is to increase the reliability, while reducing the size, weight and cost of the variable resistances of the control elements.

These and other objects will be apparent from an inspection of the drawings in which.

Figure 1:
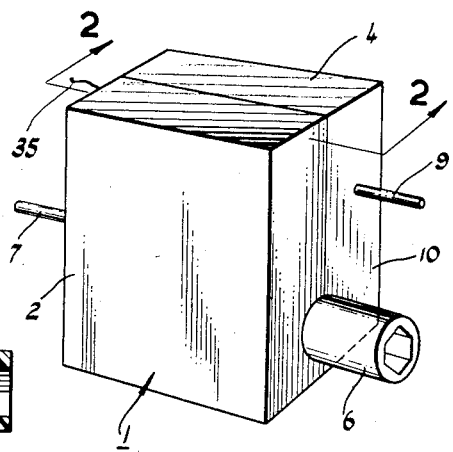
Fig. 1 is a perspective view of the device as assembled.
Figure 3:
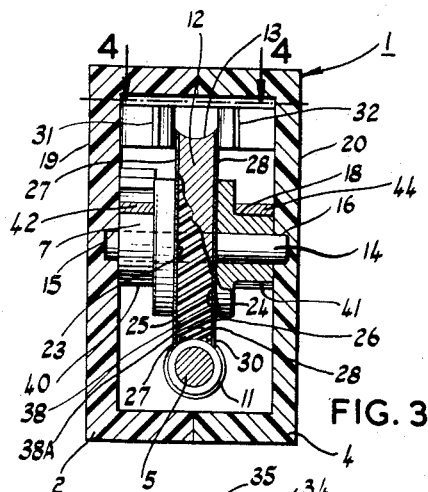
Fig. 3 is a sectional view taken as indicated by line 3—3 of Fig. 2.
Figure 5:
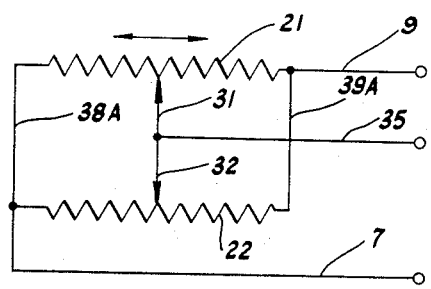
Fig. 5 is a schematic circuit diagram of the invention.
Figure 4:
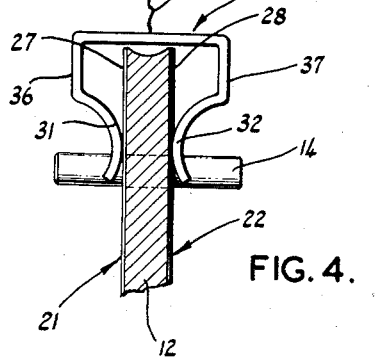
Fig. 4 is a fragmentary sectional view taken as indicated by line 4—4 of Fig. 3.

Returning now to the drawings for a more detailed description of the invention, the device has been shown in Fig. 1 in perspective.

Figure 2:
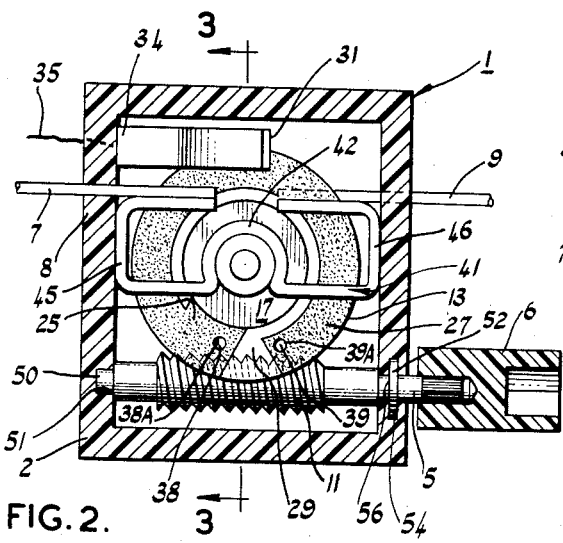
Fig. 2 is a side sectional view taken as indicated by line 2—2 of Fig. 1.

The potentiometer, indicated generally as 1, is shown as housed in a two-part case. These case portions may be molded from any suitable material, such as an insulating plastic, with the front portion 2 and the back portion 4, cemented together, as by a plastic sealing adhesive. A shaft 5 (see Fig. 2) extends rotatably from case 1, and has mounted thereon an adjusting coupling 6. Suitable means, not shown, may be inserted in coupling 6 to provide the necessary rotational adjustments. Two hub connection leads 7 and 9 are sealed through and extend from case 1. The first hub connection lead 7 extends through one end wall 8 of the front portion 2 of the case, while the second hub connection lead 9 extends through the opposite end wall 10 of the back case portion 4. Leads 7 and 9 are adapted to be bent over for dip-soldering to a supporting panel.

Within the case, shaft 5 has formed integrally therewith a worm 11, which engages mating teeth 12 formed peripherally about a worm wheel 13. The worm wheel 13 may be formed of an easily machinable rigid insulating material, such as the ceramic commercially known by the trade name "Lavite." After the "Lavite" worm wheel has been formed, it may be fired at high temperature in accordance with techniques well known in the ceramic art, producing an extremely hard, rigid, wear-resistant, non-absorbent part of excellent electrical insulating properties. A shaft 14, which may be formed of "nylon" or a similar material, is fixed axially through the worm wheel 12, and is mounted for rotation in blind bores 15 and 16 formed in the front and rear portions 2 and 4, respectively, of the case. On either side of the worm wheel 12 are disposed conducting bushings 17 and 18, respectively. These bushings are so dimensioned as to maintain the worm wheel 12 in position centrally of the housing member, as by bearing lightly against the end walls 19 and 20 of the front and rear case portions 2 and 4. The bushings 17 and 18 also serve as connection members to resistance coatings, generally indicated as 21 and 22, formed on opposite sides of the worm wheel 13.

The resistance coatings 21 and 22 consist of high resistance material, applied in a prescribed pattern by means such as the well known vacuum plating techniques to the front and rear surfaces of the "Lavite."

Conducting bushing 17 engages a central annular portion 23 of resistance coating 21, while conducting bushing 18 engages a corresponding central annular portion 24 of resistance coating 22 on the opposite side of the worm wheel 13.

The central annular portions 23 and 24 extend coaxially about, but do not touch, the supporting shaft 14. Radially extending portions 25 and 26, respectively, connect the central annular portions 23 and 24 to peripheral variable resistance portions 27 and 28 of the resistance coatings 21 and 22.

The peripheral variable resistance portions 27 and 28 extend almost around the wheel 13. Adjacent the radially extending conducting portions 25 and 26, however, sectoral portions 29 and 30 of the insulating "Lavite" wheel are exposed. The sectoral portions 29 and 30 are of sufficient width so that the low and high potential ends of the resistances 21 and 22 will not be shorted together by sliding contact arms 31 and 32.

Sliding contact arms 31 and 32 may be formed integrally as part of a sliding contact member 34. Member 34 is held between case portions 2 and 4, and has an external connection lead 35 sealed therethrough. Lead 35 is adapted to be bent over for dip-soldering on a supporting panel, as were the leads 7 and 9, as mentioned above. This facilitates production-line assembly.

The sliding contact member 34 may be held between the case portions 2 and 4 in part by the pressure of the forwardly extending portions of contact arms 36 and 37. The sliding contact arms 31 and 32 are bent inwardly from the forwardly extending portions 36 and 37 sufficiently so that they will exert a continuous pressure against the resistance coatings 21 and 22 on opposite sides of the worm wheel 12. Since the pressure is applied from both sides simultaneously, it will be obvious that accelerations in any direction to which the device may be subjected will be ineffective in breaking the circuits between the external connection lead 35 and the peripheral variable resistance portions 27 and 28.

The possibility of resistance variation by reason of contact bounce has been further obviated by joining the highpotential resistance ends together and the low potential resistance ends together on opposite sides of wheel 13. Bores 38 and 39 are formed through the wheel near the adjacent ends of these resistance coatings 21 and 22, and are lined during the vacuum plating process with connecting portions 38A and 39A, respectively, of the conducting high resistance material.

It is intended that this device will be used primarily in the nature of a trimming resistor, that is, it will not be subject to frequent changes of setting, and, in consequence, the contact arms 31 and 32 may be relatively heavily spring loaded without causing an undesirable degree of wear on the coating portions 21 and 22.

It will be observed that these contact arrangements reverse the construction usual in resistors and potentiometers, in that it is the variable resistance element itself which moves, rather than the sliding contact member. Further, the use of a solid plated coating rather than a wire wound or other type of resistance unit adds substantially to the reliability of the device. The heat dissipating capacity of this design is substantially improved over such known arrangements, in addition.

The connections to the radially extending portions 25 and 26 made through the central annular portions 23 and 24 and hubs 17 and 18 to the external circuitry, are accomplished through pre-stressed spring loading arms wiping on these hubs as connected externally through the first hub connection lead 7 and the second hub connection lead 9, to each of which is fixed one of the spring loaded hub engaging members 40 and 41. The spring loaded members 40 and 41 have central hub engaging members 42 and 44, which are arranged to snap onto the hubs 17 and 18 and to exert pressure about a major portion of the circumference thereof. The members 40 and 41 are also formed with end portions 45 and 46, which will engage against the end walls of the case portions 2 and 4, inorder to ensure that contact will be made with the hubs, regardless of any acceleration exerted on the equipment.

The worm 11 is mounted within the case with its teeth in mating registry with those of the worm wheel 13, and one end 50 of its shaft 5 seated rotatively in a blind bore 51. At its opposite end, the shaft 5 has formed therearound a ferrule portion 52 which is sealed hermetically in an annular way 54 formed cooperatively between the front and rear housing portions 2 and 4. During assembly, the way 54 is packed with a heavy lubricant which cooperates with the bore and the ferrule to form an elongated leakage path between the inside and the outside of the casing, and to effect a substantially hermetic seal.

When the device is assembled, which is accomplished by placing the worm and wheel parts in position and in proper alignment with the contact members, the two case parts are secured together by a suitable resin type glue, or the equivalent. Assembly is normally carried out in a room in which the atmosphere is controlled so that the air within the housing is relatively dry and free from contaminants. It has been our experience that when the device is thus assembled, no difficulty is experienced due to subsequent differential pressures set up between the atmosphere inside and outside the case, and as a result, problems of condensation and corrosion have been made negligible.

It will be appreciated that the invention as here disclosed provides an adjustable potentiometer which may be subjected to wide variations in external pressures and to extremely high accelerations, without introducing circuit interruptions or failures in service. At the same time, the combination of techniques involved result in an extremely low cost item of production.

What is claimed is:

1. In a potentiometer, the combination of: a front case portion; a rear case portion adapted to be secured hermetically to said front case portion; a worm wheel formed of insulating material rotatably disposed within said casing; a worm mounted within said casing in driving engagement with said worm wheel and having shaft means rotatably sealed through said casing; high resistance conducting coatings disposed peripherally about both sides of said worm wheel and having centrally disposed portions connected thereto, said peripheral coatings extending almost completely around the circumference of said worm wheel; means for connecting together the end portions of similar potential of each of said high resistance conducting coatings; means for providing opposed resilient contacting members engaging said coatings on opposite sides of said wheel; means for providing an external connection to said means; second connection means for making connection to the central portion of said coatings on both sides of said wheel; means for providing external connection to said means; means associated with said worm extending rotatably and sealingly through said casing; and means for sealing said front and rear case portions about said connecting leads and worm rotating means.

2. In a potentiometer device, a hermetically sealed casing; a worm rotatably disposed within said casing and having means for mechanical connection thereto externally of said casing; a worm wheel rotatably mounted in said casing and engaging said worm; high resistance conducting coatings formed on opposite sides of said worm wheel and electrically separated thereby, said conducting coatings each having the form of an incomplete annulus disposed about the periphery of said worm wheel; means disposed terminally of each of said incomplete annular portions for connecting the ends of corresponding potential from one side of said wheel to the other; oppositely directed resilient means for slidably engaging said resistance coatings peripherally of said worm wheel; central means for making connection to said resistance coatings separately on either side of said worm wheel; and slidable contact means arranged to engage with each of said central portions and having connection means extending sealingly through said case.

3. In a device for introducing a controllable amount of high resistance into an electrical circuit; a casing adapted to be hermetically sealed; an insulating worm wheel disposed rotatably within said case; a worm gear mounted in engagement with said worm wheel within said case and having means extending outwardly therefrom for producing rotation of said worm wheel; high resistance conducting coatings disposed on both sides of said insulating worm wheel, said coatings having a central portion and a peripheral portion connected thereto; means for connecting the corresponding ends of said peripheral portion together through said insulating worm wheel; resiliently opposed means for peripherally engaging said resistance coatings on opposite sides of said worm wheel; and means for making electrical connection to said resiliently opposed means.

4. A potentiometer device comprising: a plastic casing having dimensions of the order of 0.3" x 0.3" x 0.2"; said casing having rotatably disposed therein a worm provided with external rotation producing means; a worm wheel rotatably mounted in engagement with said worm; high resistance conducting coatings disposed on each side of said worm wheel, said high resistance conducting coatings each having a central annular portion and an outer peripheral portion, said outer peripheral portion extending almost completely around said central portion and having one end connected thereto; means for connecting each end of said peripheral portion on one side of said worm wheel to the corresponding end portion on the opposite side of said worm wheel; hub means for fixedly engaging said central resistance coating portions; supporting shaft means disposed through said wheel and said hub portions and mounted for free rotation in said casing; slidable contact means for providing separate connection to each of said hub members and external circuit means; opposed resilient contact arms arranged to engage said annular conducting portion peripherally of said wheel and to maintain opposed resilient pressures thereagainst; means for providing external connection to said resilient means; and hub engaging members disposed between said hub portions and an inner surface of said casing for maintaining said resistant coatings in engagement with said sliding contact members during accelerations of said potentiometer.

5. A potentiometer, comprising: a hermetically sealed plastic housing of the order of 0.3" x 0.3" x 0.2" in size, and having therein; a worm wheel formed of insulating material; a worm gear engaging said wheel rotatably; external means for rotating said gear and wheel; a high resistance coating disposed on each side of said wheel; said coating having a central portion and an incomplete annular peripheral portion; means connecting the corresponding high and low potential ends of said incomplete annular portions on opposite sides of said wheel; spring pressed means for slidably engaging said incomplete annular resistance coating portions on opposite sides of said wheel simultaneously at varying desired positions; means for separately engaging said central coating portions in all rotational positions of said wheel; and leads sealed separately through said casing for making connections to said central coating portions and said annular coating portions, said leads serving as potentiometer supports and connection means during a dip-soldering assembly process.

References Cited in the file of this patent

UNITED STATES PATENTS 2,764,657   Rosenthal _____ Sept. 25, 1956